(12) United States Patent
Awano et al.

(10) Patent No.: US 6,388,954 B1
(45) Date of Patent: May 14, 2002

(54) MAGNETO-OPTICAL RECORDING MEDIUM HAVING CLOCK-MARKS ON RECORDING LAYER AND APPARATUS FOR RECORDING AND REPRODUCING SAME

(75) Inventors: Hiroyuki Awano, Noda; Katsusuke Shimazaki, Toride; Hiroki Takao; Norio Ohta, both of Ibaraki; Akiyoshi Itou, Matsudo; Katsuji Nakagawa, Tokyo; Manabu Tani, Ibaraki; Masafumi Yoshihiro, Ibaraki; Masaki Sekine, Ibaraki, all of (JP)

(73) Assignee: Hitachi Maxell, Ltd., Ibaraki (JP)

( * ) Notice: Subject to any disclaimer, the term of this patent is extended or adjusted under 35 U.S.C. 154(b) by 0 days.

(21) Appl. No.: 09/280,811

(22) Filed: Mar. 30, 1999

(30) Foreign Application Priority Data

Mar. 31, 1998 (JP) .............................. 10-105807
Mar. 2, 1999 (JP) .............................. 11-053459

(51) Int. Cl.[7] .............................................. G11B 11/00
(52) U.S. Cl. .................................................. 369/13.02
(58) Field of Search ........................... 369/275.2, 275.3, 369/275.1, 13, 283, 284, 94, 275.4, 44.38, 110, 116, 54, 58, 59.1, 47, 288, 13.02, 47.28, 59.12, 13.07, 13.01; 360/59

(56) References Cited

U.S. PATENT DOCUMENTS

| | | | | |
|---|---|---|---|---|
| 4,807,204 A | * | 2/1989 | Mizutani et al. ............... | 369/13 |
| 5,062,091 A | * | 10/1991 | Maeda et al. .................. | 369/13 |
| 5,182,734 A | * | 1/1993 | Watanabe et al. ......... | 369/13.02 |
| 5,197,049 A | * | 3/1993 | Wehrenberg .................. | 369/13 |
| 5,680,267 A | * | 10/1997 | Tanaka et al. ................. | 360/51 |
| 5,708,652 A | * | 1/1998 | Ohki et al. ............... | 369/275.1 |
| 5,798,996 A | * | 8/1998 | Arai ............................. | 369/59 |
| 5,923,625 A | * | 7/1999 | Shimazaki et al. ........... | 369/13 |
| 6,046,968 A | * | 4/2000 | Abramovitch et al. ........ | 369/47 |

FOREIGN PATENT DOCUMENTS

| | | | |
|---|---|---|---|
| JP | 11-345439 | * | 12/1999 |
| WO | WO 98/02878 | | 1/1998 |

OTHER PUBLICATIONS

Y. Murakami et al., *Super Resolution Readout Of A Magneto–Optical Disk With An In–Plane Magnetication Layer*, Proceedings of Magneto–Optical Recording International Symposium '92, J. Magn. Soc. Jpn. vol. 17, Supplement No. S1 (1993), pp. 201–204.

* cited by examiner

*Primary Examiner*—Ali Neyzari
(74) *Attorney, Agent, or Firm*—Oliff & Berridge, PLC (57) ABSTRACT

The magneto-optical recording medium has a magnetic domain magnification reproducing layer and an information recording layer. Clock marks are formed on the information recording layer, making it possible to generate a reproducing clock on the basis of these. The clock marks are detected either by irradiating directly with light of wavelength $\lambda_2 (\lambda_1 \neq \lambda_2)$, being different from the light of wavelength $\lambda_1$ which is used for reproducing the recording marks, or by applying a direct-current magnetic field, transferring and enlarging the clock marks on to the magnetic domain magnification reproducing layer, and detecting the reproduction signals from this magnetic domain magnification reproducing layer. Since the reproducing clock is in exact synchronisation with the recording marks, it is eminently suitable as a clock for pulse-modulated reproducing light and reproducing magnetic fields used when reproducing the reproducing layer.

11 Claims, 7 Drawing Sheets

6: DIELECTRIC LAYER
5: INFORMATION RECORDING LAYER
4: NON-MAGNETIC LAYER
3: DOMAIN ENLARGED REPRODUCING LAYER
2: DIELECTRIC LAYER
1: TRANSPARENT SUBSTRATE

MAGNETO-OPTICAL RECORDING MEDIUM HAVING CLOCK-MARKS ON RECORDING LAYER AND APPARATUS FOR RECORDING AND REPRODUCING SAME

BACKGROUND OF THE INVENTION

1. Field of the Invention

The present invention relates to a magneto-optical recording medium having an information recording layer and a reproducing layer, together with a method of recording and reproducing the same, and an apparatus for recording and reproducing it. More specifically, it relates to a magneto-optical recording medium capable of generating a clock which is precisely synchronised with a recording domain recorded on the information recording layer, together with a method of recording and reproducing the same, and an apparatus for recording and reproducing it.

2. Description of the Related Art

Magneto-optical recording media and other magneto-optical discs are familiar as external memory in computers and elsewhere. Magneto-optical recording media permit the rewriting of information, and their capacity to handle large volumes of moving image, sound and other data has led to their frequent use as recording media in this multimedia ages. In recent years there have been calls for further increases in the storage capacity of such magneto-optical recording media, and one method of achieving this would be to make the recording magnetic domains even smaller and record information at higher densities. Recording with smaller recording magnetic domains is possible if a light pulse magnetic field modulation process is adopted whereby a magnetic field of a polarity depending on the recording signal is applied while irradiating with light which has been modulated into pulse form in synchrony with the recording clock.

However, any attempt to generate magnetic microdomains encounters the problem that it is impossible to make the spot diameter of the reproducing light smaller than the NA limit of the light head, and there is no way of reproducing separately a plurality of magnetic microdomains existing within the reproducing light spot. One suggested method of solving this problem is by means of the technique of magnetic super-resolution (MSR) (*Journal of the Magnetic society of Japan*, vol. 17, suppl. S1, p. 201, 1993). According to this technique, it is possible to reproduce one of two recording magnetic domains existing within a reproducing light spot by masking the other so that it cannot be seen, thus narrowing the effective field of vision. However, the strength of the reproduction signal from each of the magnetic domains remains the same, with the result that the C/N is low.

In International Patent Application WO98/02878 the inventors of the present invention have disclosed a magneto-optical recording medium which has a magnetic domain magnification reproducing layer and a recording layer on the substrates making it possible to transfer the magnetic microdomains of the recording layer separately at reproduction, and by applying a reproducing electric field to enlarge the magnetic domains which have been transferred to the recording layer prior to reproducing them. This magneto-optical recording medium facilitates a marked increase in the strength of the reproduction signal because the magnetic domains which are transferred on to the magnetic domain magnification reproducing layer are enlarged (magnified) to roughly light spot size. The technique has been given the name of MAMMOS (Magnetic Amplifying Magneto-Optical System), and serves to solve the problems inherent in the above-mentioned magnetic super-resolution technique in relation to the reproduction S/N of magnetic microdomains.

In MAMMOS, not only do the magnetic domains recorded on the recording layer need to be enlarged at the moment when they are transferred to the reproducing layer, but the enlarged magnetic domains must be erased immediately before the next recording magnetic domain is scanned by the light spot. For this reason, it is necessary to control the timing with which the external magnetic field is applied and the polarity reversed. MAMMOS is in the process of becoming a very important technique for improving recording density, but on the other hand certain problems become evident as the density increases.

The process whereby information is recorded on to a magneto-optical recording medium involves either light modulation, electric field modulation or a combination of the two. Whatever process is adopted, it is normal to detect a pre-pit formed on the substrate, thus generating a clock, which then becomes the criterion for irradiating with light and/or applying an external magnetic field, in accordance with the information which is to be recorded.

In the above-mentioned method of recording, however, the recording layer is irradiated with recording light and heated to a prescribed temperature while the recording electric field is applied. This is then cooled to form recording magnetic domains on the recording layer Thus, depending on conditions such as the strength of the recording light and the material from which the recording layer is fashioned, it may happen that a delay occurs before the recording magnetic domains are actually formed on the recording layer, causing them to diverge from their prescribed positions according to the recording clock. On the other hand, the fact that the reproducing external magnetic field in MAMMOS is also based on a clock pit which is formed on the substrate means there is no guarantee that the external magnetic field is being applied in line with positions where recording magnetic domains actually exist. For this reason it proved to be no easy matter to adjust the modulation timing of the reproducing external magnetic field and reproducing light applied to a MAMMOS magneto-optical recording medium.

SUMMARY OF THE INVENTION

It is an object of the present invention, which has been designed to eliminate the problems inherent in the related art, to provide a magneto-optical recording medium capable of generating a reproducing clock in synchrony to a high degree of precision with the recording domain which is recorded on the information recording layer, and to provide a method of recording and reproducing same, and apparatus for recording and reproducing it. It is a further object of the present invention to provide a magneto-optical recording medium which permits easy adjustment of the optimum timing for applying reproducing light and reproducing electric field when reproducing a magneto-optical recording medium of the type wherein a reproducing magnetic field is applied along with the reproducing light, and to provide a method of recording and reproducing same, and apparatus for recording and reproducing it.

The first aspect of the present invention provides a magneto-optical recording medium comprising an information recording layer on which information is recorded; and a reproducing layer on to which information recorded on the information recording layer is transferred, a clock mark being formed on the information recording layer.

The magneto-optical recording medium according to the present invention has clock marks formed on the information recording layer along with information recording marks. This allows a reproducing clock to be generated in accordance with the clock marks. The following are two examples of methods which may be employed in order to detect the clock marks recorded on the information recording layer, The first method of detection involves the use of two types of light of differing wavelengths $\lambda_1$ and $\lambda_2$. The reproducing layer is reproduced by means of light of wavelength $\lambda_1$, while light of wavelength $\lambda_2$ is used to read the clock marks recorded on the recording layer. The reason for using light of a different wavelength to read the reproducing clock marks is as follows. In MAMMOS and MSR there are reproducing and intermediate layers above the recording layer, so that light absorption by these layers serves to diminish the reproducing signal from the clock marks of the recording layer. What is more, the need to acquire the reproducing clocks in advance of information reproduction makes it difficult to use information reproducing light to reproduce the clock marks. The use of light of a different wavelength from that used for information reproduction makes it possible to read without difficulty the clock marks which are recorded on the information recording layer. A clock generated in accordance with clock marks read in this manner can be employed for the purpose of modulating the reproducing light to pulse form prior to irradiation, or modulating and applying the reproducing magnetic field used in AMOS and MSR.

The second method of detection consists in detecting the clock pit formed on the substrate, while at the same time irradiating the magneto-optical recording medium with light and applying a direct-current magnetic field of the same polarity as the clock marks formed on the information recording layer. Applying a direct-current magnetic field along with the incident light means that the magnetisation (magnetic domain) of the clock marks recorded on the information recording layer by virtue of this direct-current magnetic field is transferred on to the reproducing layer, the coercive force of which has been diminished by the incident light. Once the reproduction signal based on a clock mark has been detected from the reproducing layer, application of the direct-current magnetic field is halted, and a clock is generated in accordance with the detected reproduction signal. This second method of detection differs from the first in that it is possible to read the clock marks and generate a clock without employing two types of light of differing frequencies. The clock thus generated can be employed, in the same way as one generated by the first method of detection, for the purpose of modulating the reproducing light to pulse form prior to irradiation, or modulating and applying the reproducing magnetic field used in MAMMOS and MSR. The clock marks formed on the information recording layer of the magneto-optical recording medium according to the present invention function as timing marks for optimising or synchronising the application timing of the reproducing light and reproducing magnetic field with respect to the positions of the recording marks.

The reproducing layer of the magneto-optical recording medium according to the present invention should preferably be such that the magnetic domain transferred from the information recording layer is enlarged prior to reproduction by applying it with an external magnetic field of the same polarity as the magnetisation of the magnetic domain. In other words, the fact that the present invention makes it possible to generate a reproducing clock from the clock marks formed on the information recording layer means that it is possible, by applying in synchrony with this reproducing clock a magnetic field in order to enlarge the magnetic domain, not only accurately to transfer a recording magnetic domain which has diverged from the recording clock, but also to enlarge it and reproduce it at a higher C/N. What is more, in the second method of detection described above it is possible to reproduce at a higher C/N by enlarging by means of a magnetic domain magnification reproducing layer the clock marks recorded on the information recording layer. This means that it is possible accurately to generate the reproducing clock signal even if the clock marks are small.

Moreover, it should be remembered that in the present invention the light is incident from the side where the reproducing layer is formed. It is therefore preferable when in the first method of detection described above light of wavelength $\lambda_2$ is employed in order to detect the clock marks recorded on the information recording layer, either to select as wavelength $\lambda_2$ one which passes through the reproducing layer or to adjust the material of the reproducing layer so that light of wavelength $\lambda_2$ passes through it. It is also preferable for clock marks recorded on the information recording layer to be distinguished from recording marks corresponding to recording information by being longer than the shortest recording mark.

When recording marks corresponding to the desired recording information on the information recording layer in the magneto-optical recording medium to which the present invention pertains, it is also possible to do so by processing the reproducing clock signal in such a manner that the clock marks which serve to generate the reproducing clock are included in the desired recording information referred to above. Since in the first method of detection described above the clock marks recorded on the information recording layer can be detected by using light of a wavelength $\lambda_2$ differing from the light of wavelength $\lambda_1$ which serves to reproduce the reproducing layer, it does not matter whether the light of wavelength $\lambda_1$ which serves to reproduce the reproducing layer and the light of wavelength $\lambda_2$ which serves to detect the clock marks are incident simultaneously or separately. If they are incident separately, the magneto-optical recording medium may be scanned so that the $\lambda_2$ light spot precedes the $\lambda_1$.

The second aspect of the present invention provides a method of recording and reproducing a magneto-optical recording medium having an information recording layer on which information is recorded and a reproducing layer on to which information recorded on the information recording layer is transferred, comprising the steps of recording on the information recording layer recording marks corresponding to the recorded information and reproducing clock marks; and reproducing the recording marks from the magneto-optical recording medium by means of light of wavelength $\lambda_1$ while reproducing the clock marks by means of light of wavelength $\lambda_2$ ($\lambda_1 \neq \lambda_2$).

In the present invention, it is possible to take a clock pit recessed into the substrate as a criterion when recording clock marks on the information recording layer. By employing clock marks formed on the information recording layer in conformity with this recessed clock pit as clock marks for generating the reproducing clock, it is possible to obtain a clock which is corrected for divergence between the positions of the recording clock and the recording magnetic domain, and to generate a clock which is in exact synchrony with the recording magnetic domain recorded on the information recording layer. Consequently, through exact Synchronisation with the recording magnetic domain recorded on the information recording layer it is possible to irradiate with the reproducing light and impress the reproducing magnetic field, both modulated into pulse form, even if the magneto-optical recording medium is one designed for domain enlarged reproducing. Thus, even with still higher density it is possible to enlarge the recording magnetic domain accurately on the reproducing layer, and to read the information at high C/N.

The third aspect of the present invention provides a method of recording and reproducing a magneto-optical recording medium having an information recording layer on which information is recorded, and a reproducing layer on a substrate whereon a clock pit is formed, comprising the steps of recording clock marks and recording marks according to the information on the information recording layer in conformity with the clock pit; transferring on to the reproducing layer the clock marks recorded on the information recording layer by applying a direct-current magnetic field of the same polarity as the magnetisation of the clock marks while at the same time irradiating the magneto-optical recording medium with light, and detecting the reproducing clock signal from the clock marks transferred on to the reproducing layer; and reproducing the recording marks in accordance with the detected reproducing clock signal.

During recording in the method of recording and reproducing according to the third aspect of the present invention, information is recorded in accordance with a clock which is generated from a clock pit formed on the substrate. Clock marks in synchrony with the clock generated from the clock pit are recorded on the information recording layer alongside the recording information. During reproduction, a reproduction signal from the clock pit acts as a trigger, causing a direct-current magnetic field to be applied at the same time as irradiation with light. This makes it possible for the clock marks recorded on the recording layer to be transferred on to the reproducing layer, where the coercive force is reduced as a result of irradiation with light, and for the clock mark reproduction signals based on the clock marks to be detected from the reproducing layer. From the reproducing clock generated in accordance with the clock mark reproducing signals it is possible to determine with accuracy the position of the recording magnetic domain recorded on the information recording layer. Thus, by applying to the magneto-optical recording medium reproducing light and a reproducing magnetic field which have been modulated in accordance with this reproducing clock, it is possible to reproduce recording information from the information recording layer under optimised reproduction conditions.

The fourth aspect of the present invention provides an apparatus for recording and reproducing a magneto-optical recording medium having an information recording layer and a reproducing layer on a substrate thereon a clock pit is formed, comprising a light source for irradiating the magneto-optical recording medium with light; a magnetic field application device for applying magnetic field; a controller for controlling the light source and the magnetic field application device to record clock marks on the information recording layer; a first sensor for detecting the clock marks; and a reproducing clock generator for generating a reproducing clock in accordance with a clock mark detection signal detected by the first sensor.

In the apparatus for recording and reproducing according to the present invention, the first sensor detects the clock marks which have been recorded on the information recording layer, and the reproducing clock generator generates the reproducing clock in accordance with the clock mark detection signals. Because this reproducing clock is generated from clock marks which are recorded alongside recording marks, the positional relationship vis-a-vis the recording marks is defined accurately. Thus, by employing this reproducing clock it is possible to apply to the magneto-optical recording medium a reproducing magnetic field and reproducing light which are modulated at the desired timing in relation to the recording marks. The reproducing clock generator may be obtained by modifying the reproducing clock generator which is used in the reproduction apparatus of a conventional magneto-optical recording medium. For example, as is demonstrated in embodiment 2, it is possible to set up a phase modifying circuit which serves to ensure that the phase of the clock which is generated by detecting the light reflected from a clock pit formed on the substrate of the magneto-optical recording medium tallies with the phase of the reproducing clock marks. In other words, the magneto-optical recording medium to which the present invention pertains may also have a second sensor for detecting the clock pit signal from the clock pit; a phase comparator for detecting phase differences by comparing the phases of the clock pit signal from the second sensor and the clock mark signal from the first sensor; and a delay circuit which serves to correct the reproducing clock in accordance with the phase difference detected by the phase comparator in such a manner that the clock pit signal is in phase with the clock mark signal. In this case, the phase comparator compares the phase of the signal from the clock pit formed on the substrate with that of the signals from the clock marks recorded on the information recording layer. If there is any difference in phase between the two, a delay circuit or similar device is employed to correct the clock by the phase difference in such a manner that it tallies with the signals from the clock marks prior to generating the reproducing clock. In this manner, the reproducing clock Is synchronised with a high degree of accuracy against the information recording magnetic domain. It is therefore eminently suitable as an apparatus for reproducing MAMMOS, MSR and similar magneto-optical recording media.

DESCRIPTION OF THE PREFERRED EMBODIMENTS

There follows, with reference to the attached drawings, a detailed description of the preferred embodiments of the magneto-optical recording medium according to the present invention, but the present invention is limited to the embodiments.

Embodiment 1

Figure 4:
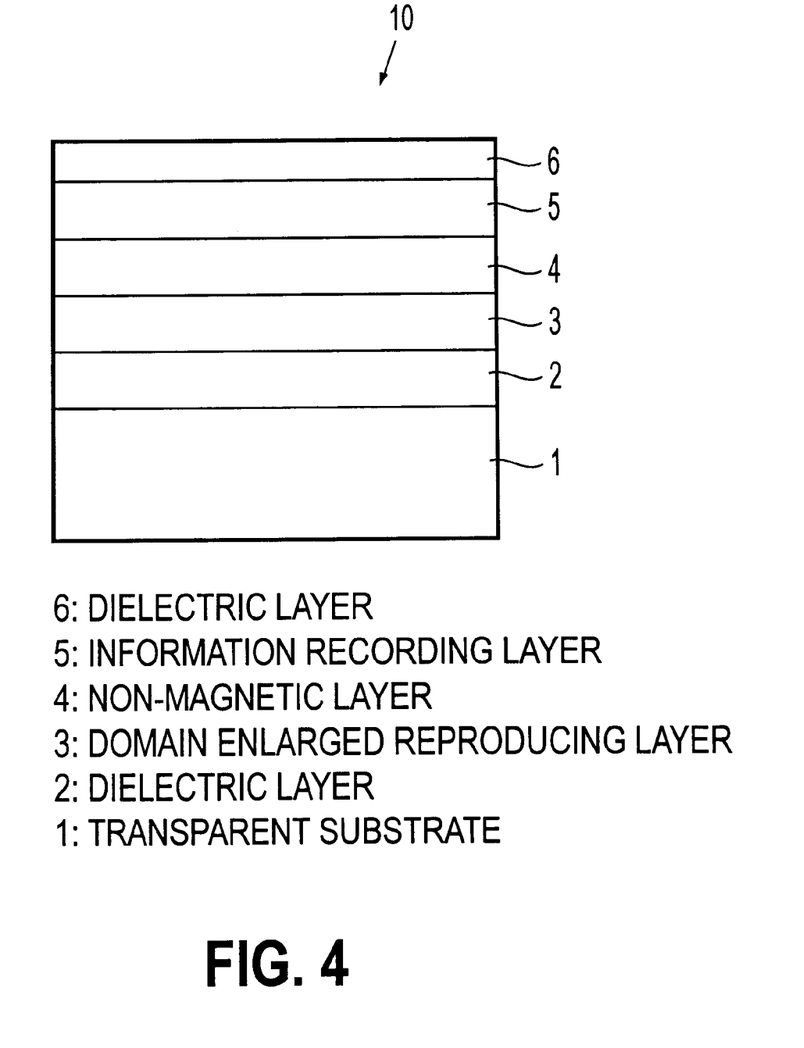
FIG. 4 is a diagram outlining the structure of the magneto-optical recording medium according to the present invention.

FIG. 4 illustrates an example of the cross-sectional structure of a magneto-optical recording medium 10 according to the present invention. The magneto-optical recording medium 10 has a transparent substrate 1, on which are laminated in order a dielectric layer 2, a magnetic domain magnification reproducing layer 3, a nonmagnetic layer 4, an information recording layer 5, and a dielectric layer 6. The transparent substrate 1 is a polycarbonate substrate with 1.2 mm thickness. On the transparent substrate 1 were formed in advance concave and convex sections corresponding to pre-formatted signals, such as A clock pit. SiN is used for the dielectric layers 2, 6, which had 70 nm in thickness, respectively. The magnetic domain magnification reproducing layer 3 comprised a GdFeCo alloy with a compensation temperature of approximately −50° C. and a Curie temperature of approximately 350° C., and was 8 nm thick. The non-magnetic layer 4 was formed of SiN, and had a thickness of 10 nm. The information recording layer 5 comprised a GdFeCo alloy with a compensation temperature of approximately −50° C. and a Curie temperature of approximately 270° C., and had a thickness of 200 nm. These layers were each formed by successive sputtering with the aid of a magnetron sputtering device. In this manner it was possible to obtain a magneto-optical recording medium 10 on which a clock pit and other pre-pits were formed as pre-formatted signals.

Figure 2:
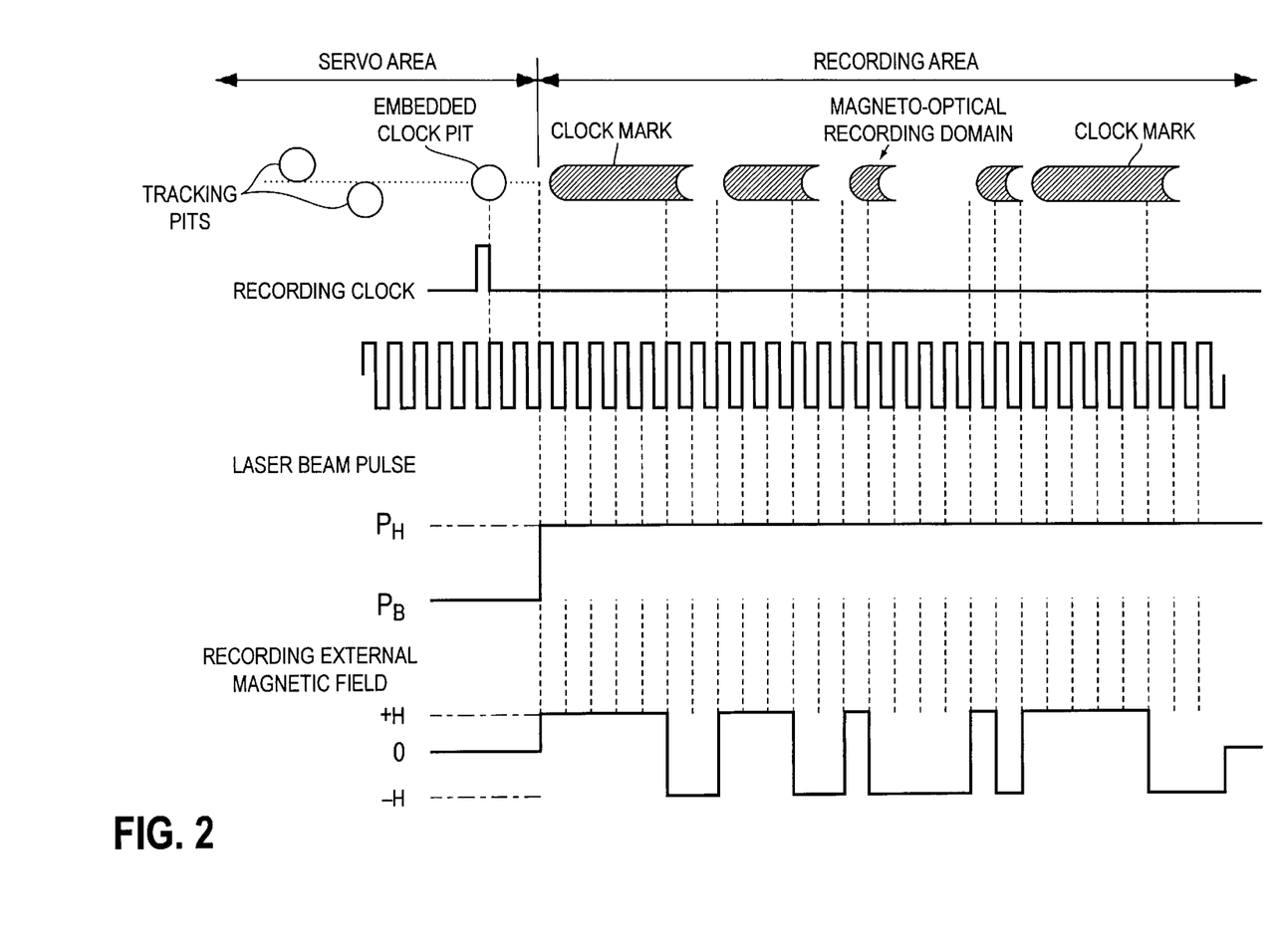
FIG. 2 is a timing chart which illustrates the relationship between the recording laser pulse, recording external magnetic field and recording domain in the method of light pulse magnetic field modulation recording according to the preferred embodiments.

Next, the resultant magneto-optical recording medium 10 was mounted in a recording and reproducing apparatus (not depicted in the drawing), and the magnetic field modulation process was applied in order to record information as explained below. It should be added that a recording clock for the purpose of recording data was obtained by detecting the clock pit formed in advance on the magneto-optical recording medium 10. The magneto-optical recording medium was rotated at a linear velocity of 2.5 m/s, and irradiated continually with a laser beam having a wavelength of 680 nm. At the same time, an external magnetic field modulated with ±200 Oe was applied, its polarity being controlled in such a manner as to correspond to the data signal. Meanwhile, clock information corresponding to a recording clock was included at a stipulated cycle within the recorded data array. In this manner, clock marks and magnetic microdomains were formed on the information recording layer 5 of the magneto-optical recording medium 10. FIG. 2 illustrates the recording laser beam against the recording clock, the timing chart of the external magnetic field, and the pattern of magnetic microdomains 9 and clock marks 9 formed on the recording layer. In FIG. 2, the servo area represents the area formed on the substrate, while the recording area represents the recording area of the recording layer 5, the two demonstrating in outline the principle behind the present invention.

Figure 1:
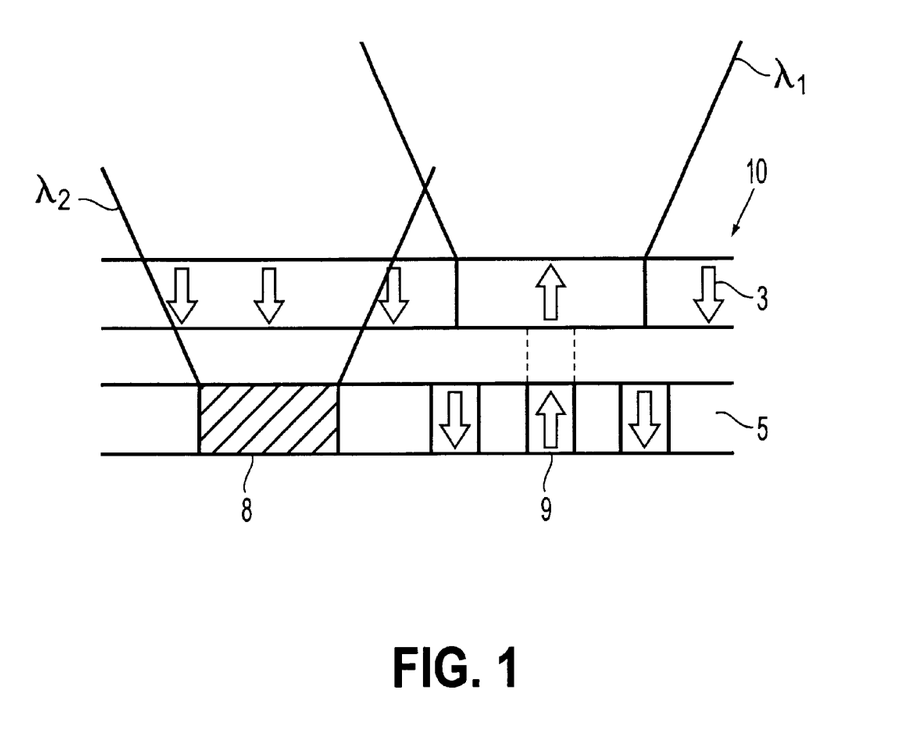
FIG. 1 is an outline diagram illustrating two types of light of differing waveforms incident upon the magneto-optical recording medium to which the present invention pertains.
Figure 3:
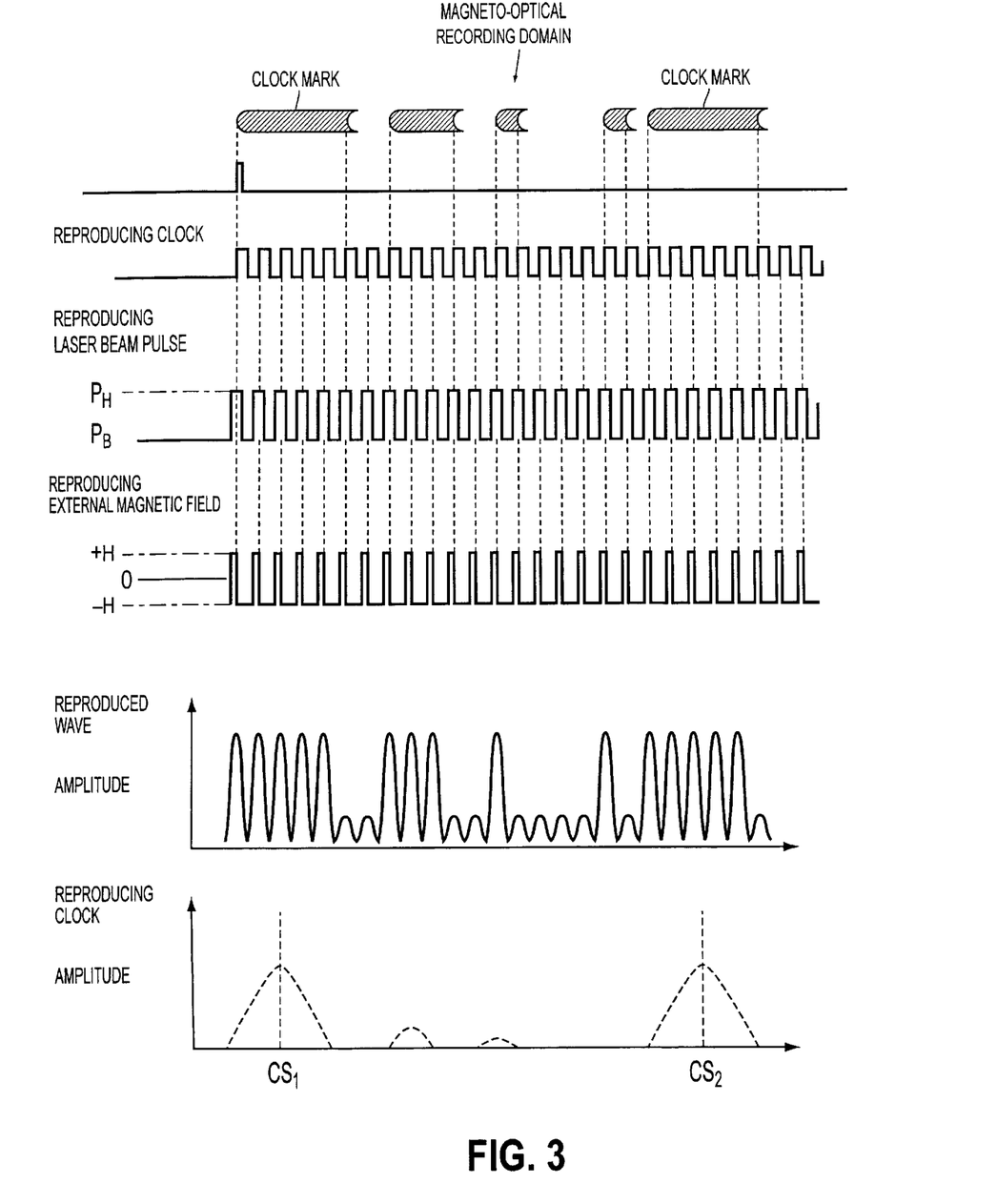
FIG. 3 is a timing chart which illustrates the reproducing clock, reproducing laser pulse, reproducing external magnetic field and reproduction signal waveform in the method of reproducing according to Embodiment 1.

Next, the magneto-optical recording medium 10 with its magnetic microdomains was reproduced with the aid of the recording and reproducing apparatus in the manner described below. As may be seen from FIG. 1, the recording layer 5 was irradiated with a condensed laser beam of wavelength $\lambda_2$ =780 nm in order to detect the clock mark 8 formed on the recording layer 5. There reproduction waveform from the detected clock mark is represented by the broken line on the lowest level of FIG. 3. Next, a suitable slice was applied to the detected clock mark to determine the clock reference positions $CS_1$, $CS_2$. The interval between $CS_1$ and $CS_2$ was then divided to produce the clock shown on the third level of FIG. 3. The reproducing laser beam of wavelength $\lambda_1$ =633 nm was modulated into pulse form by synchronising it with the reproducing clock as shown on the fourth level of FIG. 3. Then, as illustrated in FIG. 1, the reproducing layer 3 was irradiated with the reproducing laser beam in such a manner that the light $\lambda_1$ tracked the light spot $\lambda_2$, and the reproducing pulse magnetic field was applied after being modulated into pulse form by virtue of synchronisation with the reproducing clock as illustrated on the fifth level of FIG. 3. The strength of the pulse-form magnetic field in the vicinity of the centre of the magnetic domain was 200 Oe in the recording direction, and 250 Oe in the erasure direction. In this manner, a reproduction waveform was obtained of the sort illustrated on the sixth level of FIG. 3. It will be seen from FIG. 3 that use of MAMMOS makes it possible to obtain a reproduction signal which is amplified and in which each magnetic microdomain is identified.

Embodiment 2

Figure 5:
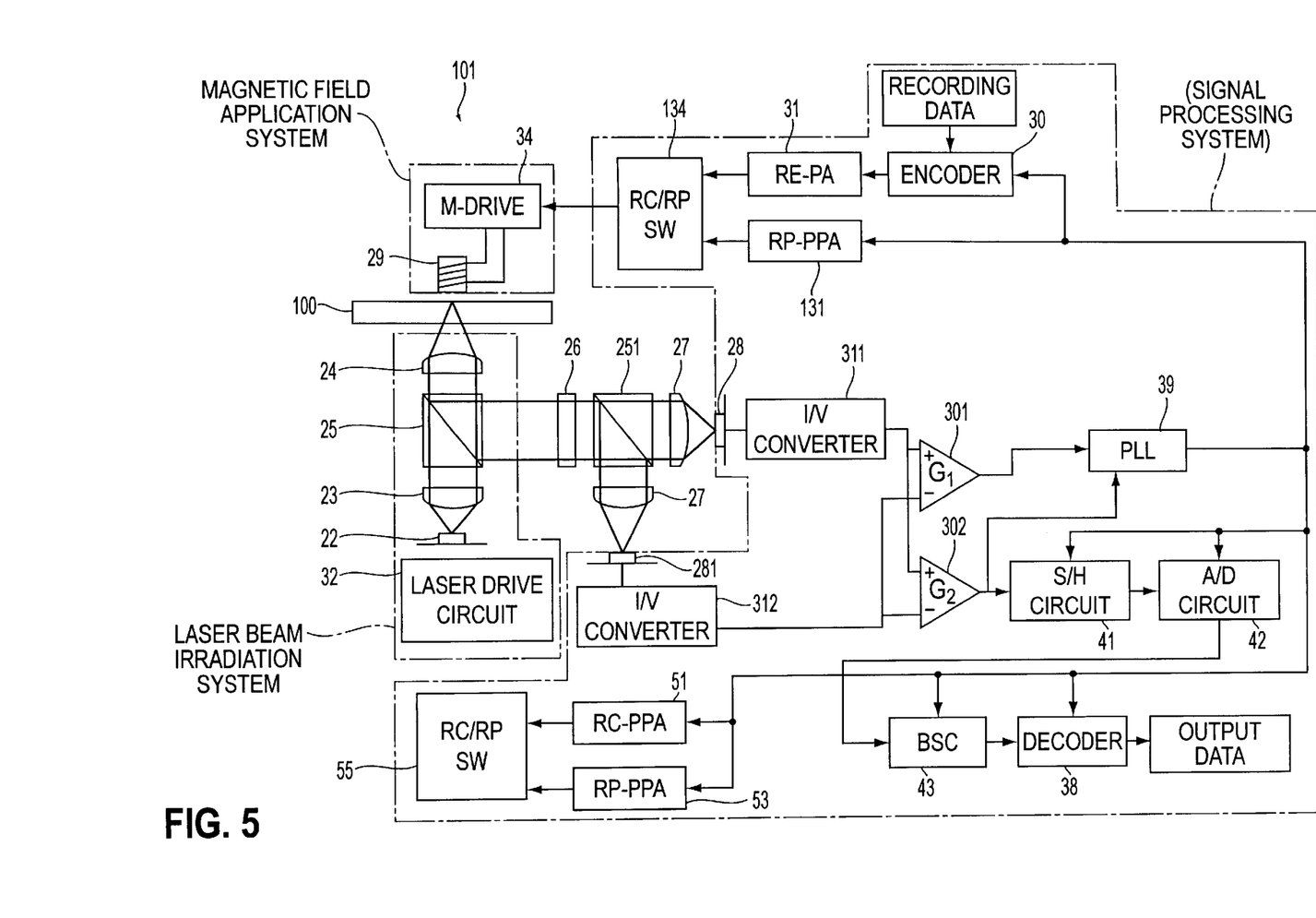
FIG. 5 is a diagram outlining the structure of the apparatus for recording and reproducing according to the present invention.

FIG. 5 is a diagram outlining the structure of the apparatus for recording and reproducing according to the present invention. The apparatus for recording and reproducing 101 comprises in the main a laser irradiation unit for irradiating the magneto-optical recording medium 10 with light modulated in pulse form at a cycle synchronised with the code data, and signal processing system which detects and processing signals from the magneto-optical recording medium 10. Within the laser irradiation unit 10, the laser 22 is connected to a laser drive circuit 32 and a record/reproduction switch (RC/RP SW) 55. The record/reproduction switch 55 allows the signals input to the laser drive circuit 32 to be switched between recording and reproducing, and is connected to a recording pulse width/phase adjustment circuit (RC-PPA) 51 and a reproduction pulse width/phase adjustment circuit (RP-PPA) 53. The laser drive circuit 32 receives signals from the recording pulse width/phase adjustment circuit 51 or the reproduction pulse width/phase adjustment circuit 53, thereby controlling the pulse width and phase of the laser 22. The recording pulse width/phase adjustment circuit 51 receives the recording clock referred to below from a PLL circuit 39 at the time of recording, and generates a first synchronisation signal in order to adjust the phase and pulse width of the laser beam. Meanwhile, the reproduction pulse width/phase adjustment circuit 53 receives the reproducing clock referred to below from the PLL circuit 39 at the time of reproduction, and generates a second synchronisation signal in order to adjust the phase and pulse width of the laser beam.

Within the magnetic field application unit, a magnetic coil 29 which serves to impress a magnetic field is connected to a magnetic coil drive circuit (M-DRIVE) 34, and it is possible to switch between applying a direct-current (DC) magnetic field (continuous magnetic field) and a pulse magnetic field (alternating magnetic field) on the magneto-optical recording medium 10 During recording, the magnetic coil drive circuit 34 controls the magnetic coil 29, receiving encoded data by way of a phase adjustment circuit (RE-PA) 31 from a converter 31, where recording data is converted into a prescribed code. Meanwhile, during reproduction it receives the clock signal referred to below from the PLL circuit 39, and generates a third synchronisation signal by way of a reproduction pulse width/phase adjustment circuit (RP-PPA) 131 in order to adjust the phase and pulse width, controlling the magnetic coil 29 in accordance with this third synchronisation signal. A record/reproduction switch (RC/RP SW) 134 is connected to the magnetic coil drive circuit 34 in order to switch the signal input to the magnetic coil drive circuit 34 between record and reproduction.

Figure 6:
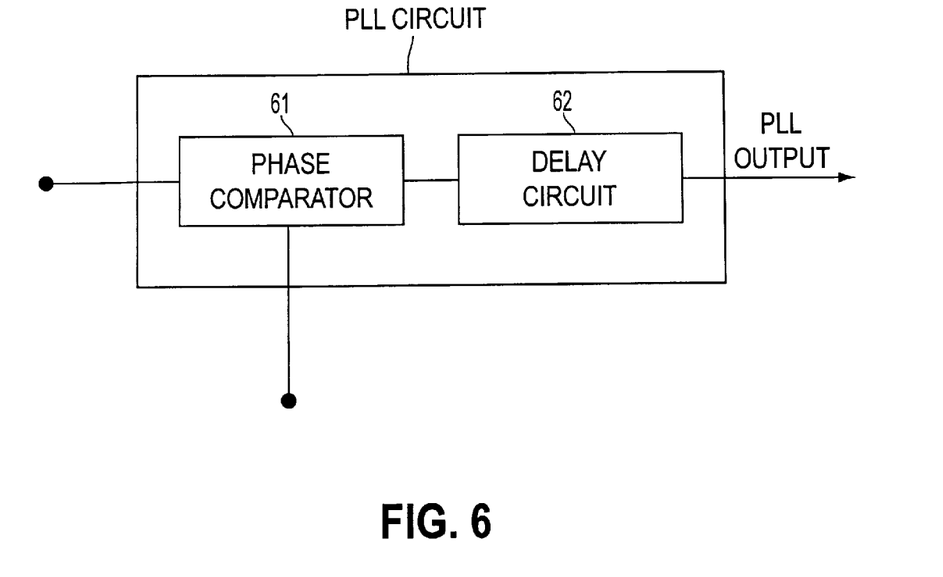
FIG. 6 is a diagram which serves to explain the internal structure of the PLL circuitry in the apparatus for recording and reproducing according to the present invention.

In the signal processing system, a first polarizing prism 25 is located between the laser 22 and the magneto-optical recording medium 10, and at the side of it is located a second polarising prism 251, and sensors 28, 281. The sensors 28, 281 are both connected by way of I/V converters 311, 312 respectively to an adder 301 and a subtracter 302. The adder 301 and part of the subtracter 302 are both connected to the PLL circuit 39, while the remainder of the subtracter 302 is connected to a sample hold (S/H) circuit 41 which serves to hold signals in synchrony with the clock, to an A/D converter circuit 42 which performs analogue-digital conversions also in synchrony with the clock, and by way of a binarising signal processing circuit (BSC) 43 to a decoder 38. The PLL circuit 39 has a phase comparator 61 and a delay circuit 62 as illustrated in FIG. 6. On the magneto-optical recording medium 10 is formed in advance a clock pit for generating tracking error and clock signals. During reproduction, the phase comparator 61 compares the phases of the signal representing reflected light from the clock pit as detected by the adder 301 and those representing reflected light from the clock marks as detected by the subtracter 302. If there is a difference in phase, it is corrected by the delay circuit 62 and a reproducing clock is output in such a manner as to tally with the signals from the clock marks as detected by the subtracter 302. During recording, the PLL circuit 39 outputs a recording clock in conformity with the signal from the clock pit as detected by the adder 301.

Next, a magneto-optical recording medium was prepared with the same laminated structure as that described in embodiment 1. It was mounted on the recording and reproducing apparatus 101, and data was recorded and reproduced. During data recording, the laser drive circuit 32 was used to modulate the laser 22 by a stipulated frequency in order to synchronise it with the recording clock. Before information was recorded, a magnetic field Was applied in the record direction by controlling the magnetic coil drive device 34, thus forming in a prescribed area of the information recording layer a clock mark corresponding to the recording clock. Following this, the encoder 30 of the magnetic field application unit was controlled in order to generate a data signal of the recording clock cycle. The generated data signal was sent by way of the phase adjustment circuit 31 to the magnetic coil drive device 34, where it controlled the magnetic coil 29, applying a magnetic field of the polarity corresponding to the data signal on the heated section of the data recording area of the magneto-optical recording medium 10. In this manner, clock marks and recording marks (recording magnetic domains) were each formed on the information recording layer of the magneto-optical recording medium.

Figure 7:
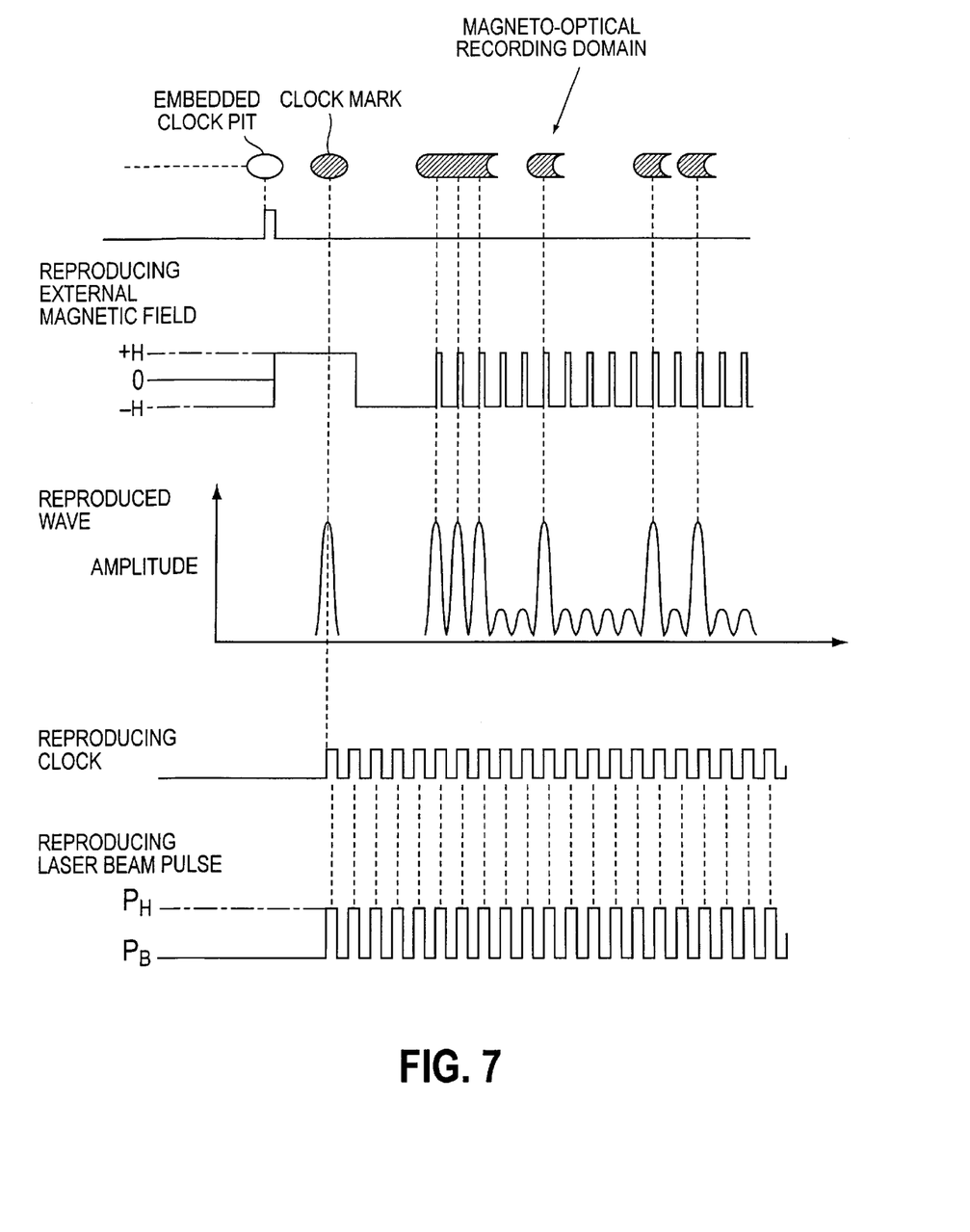
FIG. 7 is a timing chart which illustrates the DC magnetic field, reproducing clock, reproducing laser pulse, reproducing external magnetic field and reproduction signal waveform in the apparatus for recording and reproducing to which Embodiment 2 pertains.

During data reproduction, the magneto-optical recording medium was irradiated with a condensed reproducing laser beam by means of an objective lens 24, detecting the signal from the clock pit formed in advance on the magneto-optical recording medium. As is shown in the timing chart which forms FIG. 7, a direct-current magnetic field in applied in the record direction at the same time as the signal from the clock pit is detected. Applying a direct-current magnetic field caused the clock mark formed on the information recording layer to be transferred and enlarged on the reproducing layer, where the coercive force is reduced as a result of irradiation. The fifth level of FIG. 7 shows a reproducing clock which has been generated from the PPL circuit illustrated in FIG. 6 in line with reproduction signals from the clock marks amplified on the magnetic domain magnification reproducing layer. Next, the magneto-optical recording medium was irradiated with a reproducing laser beam modulated into pulse form with two powers PH, PL by synchronising it with the reproducing clock. At the same time the reproducing magnetic field was also applied in pulse form by synchronising it with the reproducing clock. The cycle of the reproducing clock was 40 ns, and as synchronisation timing for the reproducing light was adjusted so that the waveform of the high-power laser beam PH rose at a position shifted by −20 ns from the leading edge of the recording mark. Meanwhile, as synchronisation timing for the reproducing external magnetic field it was adjusted so that the waveform of the domain enlarged magnetic field +H rose at a position shifted by −20 ns from the leading edge of the recording mark. The strength of the pulse-form magnetic field in the vicinity of the centre of the recording was set to 200 Oe in the record direction, and 250 Oe in the erase direction. The duty of the reproducing laser beam was 30%. As is illustrated in level 4 of FIG. 7, it was clear that MAMMOS allowed the recording mark to be distinguished, while at the same time allowing an amplified reproduction signal to be obtained.

The above is a detailed description of the preferred embodiments of the present invention, which is nevertheless in no way restricted to these. For instance, the above embodiments have employed a magneto-optical recording medium for use in specific domain enlarged reproduction as the magneto-optical recording medium, but the invention is not limited to this, and the magneto-optical recording media disclosed in International Patent Applications WO98/02877, WO98/02878, WO97/22969 and WO97/03439 may be adopted. International Patent Applications WO98/02877, WO98/02878, WO97/22969 and WO97/03439 and the corresponding US Patent Applications or US Patents are incorporated hereinto by reference. Moreover, the present invention is not restricted to a magneto-optical recording medium for use in specific domain enlarged reproduction, and may also be applied to magneto-optical recording media for use in magnetic super-resolution, and to phase change type and dye type optical recording media.

In the magneto-optical recording medium to which the present invention pertains, clock marks are formed on the information recording layer. As a result it is possible to generate a reproducing clock based on these clock marks by virtue of direct detection of the clock marks by irradiating the information recording layer with light of a different wavelength from the wavelength of the light which is used to read the reproducing layer, or by applying a direct-current magnetic field at the same time as the clock pit formed on the substrate is detected, transferring the clock marks on to the reproducing layer, and detecting signals based on the clock marks from the reproducing layer. The clock thus generated is in exact synchronisation with the recording magnetic domains recorded on the recording layer, so that it is eminently suitable as a clock for pulse-modulated reproducing light and reproducing magnetic fields used when reproducing the reproducing layer.

Moreover, in the method of recording and reproducing a magneto-optical recording medium to which the present invention pertains, the clock marks for use in generating the reproducing clock are included within the recording information and recorded on the information recording layer along with recording marks corresponding to the recording information. The recording information transferred from the information recording layer is reproduced with light of wavelength $\lambda_1$, while the clock marks are reproduced with light of wavelength $\lambda_2 (\lambda_1 \neq \lambda_2)$, making it possible to generate a clock by extracting the clock mark signals only. Since the clock thus generated is in exact synchronisation with the recording information, it can be used as the reproducing clock.

Furthermore, in the apparatus for recording and reproducing a magneto-optical recording medium to which the present invention pertains, the reproducing clock is generated from clock marks recorded on the information recording layer, so that if this reproducing clock is employed when applying reproducing light or a reproducing magnetic field which have been modulated in pulse form, it is easy to find the optimal timing. For this reason recording information can be reproduced under optimum and accurate reproducing conditions even if the magneto-optical recording medium has ultra-high density.

What is claimed is:

1. A method of recording and reproducing a magneto-optical recording medium having an information recording layer on which information is recorded, and a reproducing layer on to which information recorded on the information recording layer is transferred, comprising the steps of:

magnetically recording on the information recording layer recording marks corresponding to the recording information and reproducing clock marks;

reproducing the recording marks from the magneto-optical recording medium by means of light of wavelength $\lambda_1$; and reproducing the clock marks by means of light of wavelength $\lambda_2$, where $\lambda_2$ is different from $\lambda_1$.

2. A method of recording and reproducing a magneto-optical recording medium having an information recording layer on which information is recorded, and a reproducing layer on a substrate whereon a clock pit is formed, comprising the steps of:

magnetically recording clock marks and recording marks according to the information on the information recording layer in conformity with the clock pit;

transferring on to the reproducing layer the clock marks magnetically recorded on the information recording layer by applying a direct-current magnetic field of the same polarity as magnetisation of the clock marks while irradiating the magneto-optical recording medium with light, and detecting the reproducing clock signal from the clock marks transferred on to the reproducing layer; and reproducing the recording marks in accordance with the detected reproducing clock signal.

3. The method of recording and reproducing a magneto-optical recording medium according to claim 2, wherein the clock marks are formed between the clock pit and the area where the recording marks are recorded.

4. The method of recording and reproducing a magneto-optical recording medium according to claim 3, wherein the magnetic field of the same polarity as the magnetisation of the clock marks is applied immediately upon detection of the clock pit.

5. The method of recording and reproducing a magneto-optical recording medium according to claim 2, wherein the clock marks are transferred on to the reproducing layer and enlarged.

6. The method of recording and reproducing a magneto-optical recording medium according to claim 2, wherein the modulation timing of at least one of the reproducing magnetic field and the reproducing light is adjusted in accordance with the detected clock marks, while a reproducing magnetic field and a reproducing light are applied to the magneto-optical recording medium.

7. The method of recording and reproducing a magneto-optical recording medium according to claim 2, wherein a direct-current magnetic field is applied after the clock pit is detected, and an alternating magnetic field is applied after the clock marks are detected.

8. The method of recording and reproducing a magneto-optical recording medium according to claim 7, wherein the recording marks from the information recording layer are transferred on to the reproducing layer by means of the reproducing magnetic field and reproducing light, and enlarged.

9. An apparatus for recording and reproducing a magneto-optical recording medium having an information recording layer and a reproducing layer on a substrate whereon a clock pit is formed, comprising:

a light source for irradiating the magneto-optical recording medium with light;

a magnetic field application device for applying magnetic field;

a controller for controlling the light source and the magnetic field application device to magnetically record clock marks on the information recording layer;

a first sensor for detecting the clock marks; and a reproducing clock generator for generating a reproducing clock in accordance with a clock mark detection signal detected by the first sensor.

10. The apparatus for recording and reproducing a magneto-optical recording medium according to claim 9, further comprising a second sensor for detecting a clock pit signal from the clock pit; a phase comparator for detecting phase differences by comparing the phases of the clock pit signal from the second sensor and the clock mark signal from the first sensor; and a delay circuit which serves to correct the reproducing clock in accordance with the phase difference detected by the phase comparator in such a manner that the clock pit signal is in phase with the clock mark signal.

11. The method of recording and reproducing a magneto-optical recording medium according to claim 9, wherein a direct-current magnetic field is applied after the clock pit is detected, and an alternating magnetic field is applied after the clock marks are detected.

* * * * *